(12) United States Patent
Hsu et al.

(10) Patent No.: US 11,410,334 B2
(45) Date of Patent: Aug. 9, 2022

(54) VEHICULAR VISION SYSTEM WITH CAMERA CALIBRATION USING CALIBRATION TARGET

(71) Applicant: Magna Electronics Inc., Auburn Hills, MI (US)

(72) Inventors: Tao-I Hsu, Oakville (CA); James Turk, Oakville (CA); Alexander Velichko, Toronto (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 17/248,681

(22) Filed: Feb. 3, 2021

(65) Prior Publication Data

US 2021/0241492 A1    Aug. 5, 2021

Related U.S. Application Data

(60) Provisional application No. 62/969,390, filed on Feb. 3, 2020.

(51) Int. Cl.

| | |
|---|---|
| *G06T 7/80* | (2017.01) |
| *H04N 17/00* | (2006.01) |
| *G06T 7/13* | (2017.01) |
| *G06T 7/73* | (2017.01) |
| *B60R 11/04* | (2006.01) |
| *B60R 16/023* | (2006.01) |

(52) U.S. Cl.
CPC ............. *G06T 7/80* (2017.01); *B60R 11/04* (2013.01); *B60R 16/0231* (2013.01); *G06T 7/13* (2017.01); *G06T 7/73* (2017.01); *H04N 17/002* (2013.01); *G06T 2207/30244* (2013.01); *G06T 2207/30252* (2013.01)

(58) Field of Classification Search
CPC .... G06T 7/80; G06T 7/13; G06T 7/73; G06T 2207/30244; G06T 2207/30252; H04N 17/002; B60R 11/04; B60R 16/0231
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |

(Continued)

*Primary Examiner* — Zaihan Jiang
(74) *Attorney, Agent, or Firm* — Honigman LLP

(57) ABSTRACT

A method for calibrating a vehicular camera of a vehicular vision system includes placing a target with a first portion having a first geometric pattern and a second portion having a second geometric pattern within the field of view of the vehicular camera, and capturing image data with the camera representative of the field of view of the vehicular camera. Two edges of both portions of the target are detected, and edge pixels of the detected edges are determined. First and second vanishing points of the target in the captured image data are determined based on the determined edge pixels of the respective first and second portions of the target. Camera orientation is determined based on location of the determined first vanishing point relative to location of the determined second vanishing point. The vehicular camera is calibrated based on the determined camera orientation.

24 Claims, 11 Drawing Sheets

(56) References Cited

U.S. PATENT DOCUMENTS

| | | |
|---|---|---|
| 7,855,755 B2 | 12/2010 | Weller et al. |
| 8,421,865 B2 | 4/2013 | Euler et al. |
| 9,150,155 B2 | 10/2015 | Vico et al. |
| 9,205,776 B2 | 12/2015 | Turk |
| 9,357,208 B2 | 5/2016 | Gupta et al. |
| 9,491,450 B2 | 11/2016 | Kussel |
| 9,491,451 B2 | 11/2016 | Pliefke |
| 9,563,951 B2 | 2/2017 | Okouneva |
| 9,688,200 B2 | 6/2017 | Knudsen |
| 9,723,272 B2 | 8/2017 | Lu et al. |
| 9,762,880 B2 | 9/2017 | Pflug |
| 9,834,153 B2 | 12/2017 | Gupta et al. |
| 9,916,660 B2 | 3/2018 | Singh et al. |
| 10,071,687 B2 | 9/2018 | Ihlenburg et al. |
| 10,099,614 B2 | 10/2018 | Diessner |
| 10,179,543 B2 | 1/2019 | Rathi et al. |
| 10,380,765 B2 | 8/2019 | Singh et al. |
| 10,453,217 B2 | 10/2019 | Singh et al. |
| 10,504,241 B2 | 12/2019 | Singh |
| 10,816,666 B2 | 10/2020 | Nicke et al. |
| 10,884,103 B2 | 1/2021 | Pliefke et al. |
| 10,946,799 B2 | 3/2021 | May |
| 2012/0057799 A1* | 3/2012 | Nguyen ............... H04N 19/91 382/232 |
| 2012/0180084 A1* | 7/2012 | Huang ............... H04N 5/2224 725/32 |
| 2014/0043473 A1* | 2/2014 | Gupta ..................... B60R 1/00 348/135 |
| 2014/0241579 A1* | 8/2014 | Nonaka ................. G06T 7/73 382/103 |
| 2017/0024861 A1* | 1/2017 | Arata ................... H04N 7/183 |
| 2017/0236258 A1* | 8/2017 | Hsu ...................... G06T 7/143 382/260 |
| 2017/0344821 A1* | 11/2017 | Gaskill ............... G06V 10/273 |
| 2017/0372481 A1* | 12/2017 | Onuki ..................... G06T 7/00 |
| 2018/0040141 A1* | 2/2018 | Guerreiro ............. G06V 20/56 |
| 2018/0281698 A1 | 10/2018 | Tang et al. |
| 2019/0094347 A1 | 3/2019 | Singh |
| 2020/0057487 A1* | 2/2020 | Sicconi ................. G06N 20/00 |
| 2020/0167578 A1* | 5/2020 | Ding ....................... G06T 7/13 |
| 2020/0193641 A1* | 6/2020 | Markkassery ...... H04N 5/23238 |
| 2021/0197893 A1 | 7/2021 | Okouneva et al. |
| 2021/0229706 A1* | 7/2021 | Jones ................... G05D 1/0223 |
| 2021/0241492 A1 | 8/2021 | Hsu et al. |

\* cited by examiner

VEHICULAR VISION SYSTEM WITH CAMERA CALIBRATION USING CALIBRATION TARGET

CROSS REFERENCE TO RELATED APPLICATION

The present application claims the filing benefits of U.S. provisional application Ser. No. 62/969,390, filed Feb. 3, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a method for calibrating a vehicular camera of a driving assistance system or vision system or imaging system for a vehicle that utilizes one or more cameras (preferably one or more CMOS cameras) to capture image data representative of images exterior of the vehicle. The method includes placing a target within the field of view of the vehicular camera and capturing image data with the camera representative of the field of view of the vehicular camera. The target includes a first portion of the target with a first geometric pattern and a second portion of the target with a second geometric pattern. The method also includes detecting first and second edges of the first portion of the target and third and fourth edges of the second portion of the target. The method also includes determining first edge pixels representative of the first detected edge of the first portion of the target, second edge pixels representative of the second detected edge of the first portion of the target, third edge pixels representative of the third detected edge of the second portion of the target, and fourth edge pixels representative of the fourth detected edge of the second portion of the target. The method also includes determining a first vanishing point based on the determined first edge pixels of the first portion of the target and the determined second edge pixels of the first portion of the target, and determining a second vanishing point based on the determined third edge pixels of the second portion of the target and the determined fourth edge pixels of the second portion of the target. The method also includes determining camera orientation based on location of the determined first vanishing point relative to location of the determined second vanishing point. The method includes calibrating the vehicular vision system for the vehicular camera based on the determined camera orientation.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture image data representative of the scene exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
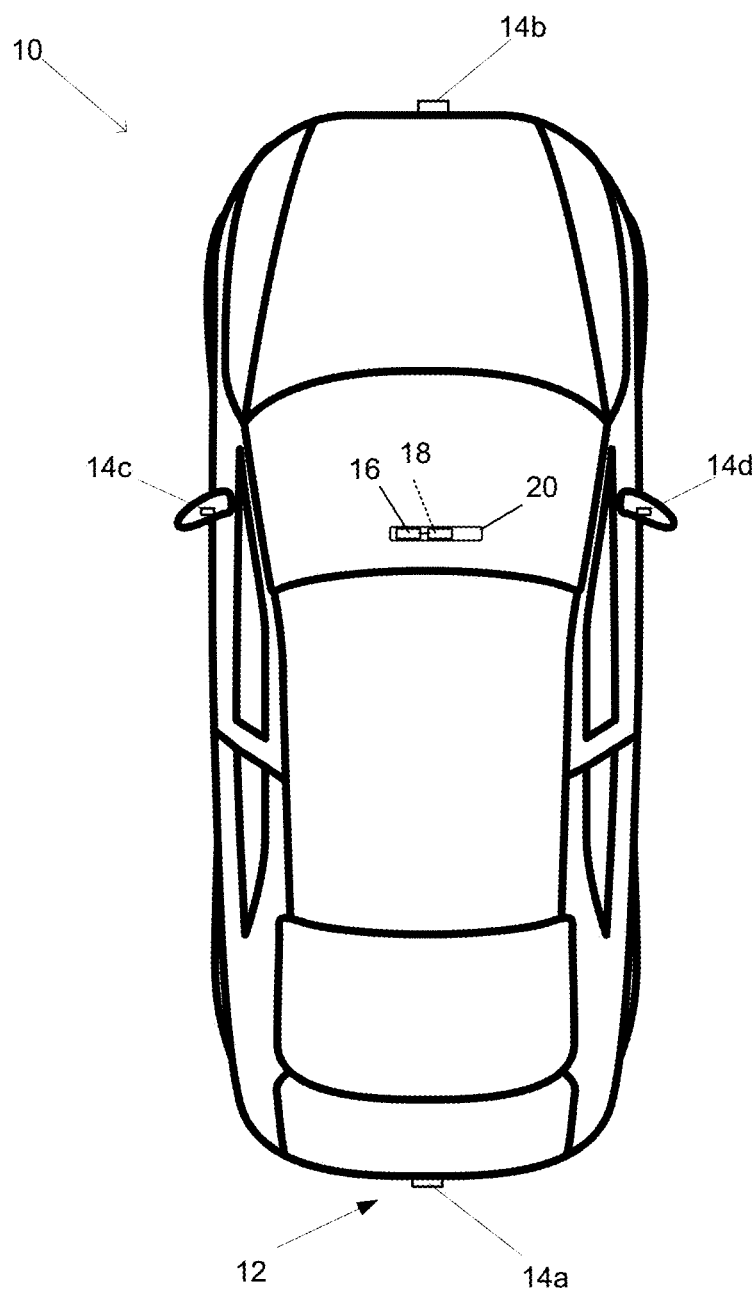
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures image data representative of the scene exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras (such as multiple frames of image data captured by the camera or cameras), whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Camera calibration is an essential phase of visual odometry in vehicle vision systems and autonomous driving systems. Accurate camera calibration (e.g., adjusting a position of the camera or adjusting processing of image data captured by the camera to accommodate a determined rotational and/or translational offset or misalignment of the camera at the vehicle) is necessary for extracting precise reliable geometric information to obtain perspective projection from the three-dimensional (3D) world to a two-dimensional (2D) image plane. Using given camera intrinsic data such as focal length, principal point and lens distortion parameters, etc., an extrinsic parameter such as camera orientation in pitch-yaw-roll and associated with a translation parameter can be calculated to construct a perspective projection model.

A conventional camera calibration technique is often implemented based on a pre-arranged 3D control scene containing known 3D control points. In this technique, the camera captures a plane image of the 3D control scene. Next, points in the image plane corresponding to the known 3D control points are determined. The correspondence between the set of points in the plane image are then calculated to obtain extrinsic parameters in the perspective projection model.

Using this technique, the 3D control points must be accurate to achieve accurate camera calibration. However, implementing the 3D control scene is a complex and difficult manual arrangement and it is not always available for each calibration. Thus, point-based approaches result in lower calibration accuracy.

Another technique attempts to achieve camera calibration using a pair of parallel lines to calibrate the extrinsic parameters from a single perspective image. This method is widely used improve techniques for accurate camera calibration to overcome the disadvantage in point-based approaches.

Figure 2:
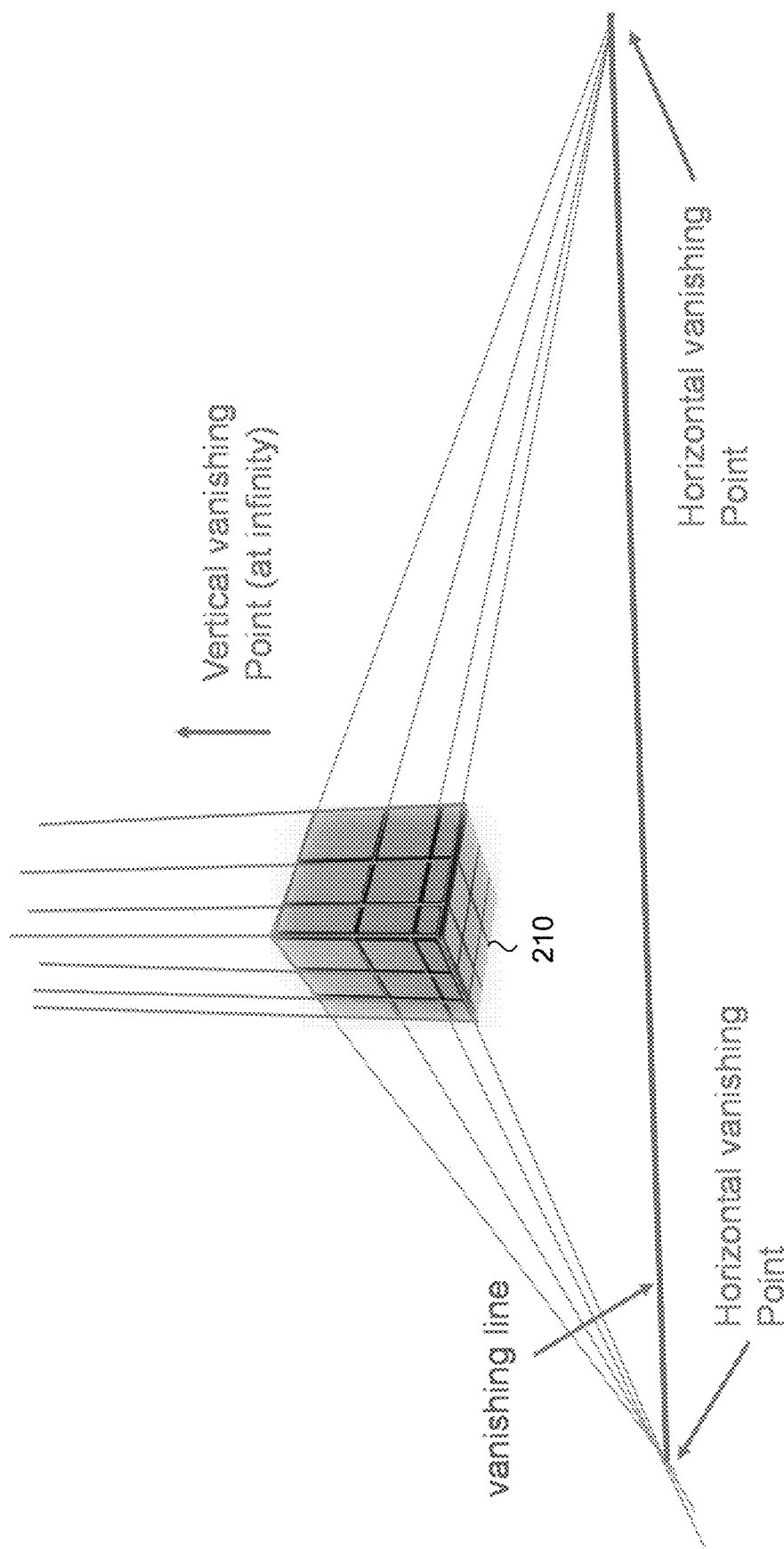
FIG. 2 is a perspective view of a target with orthogonal lines in accordance with the present invention.

Implementations herein relate to techniques for camera calibration, and more particularly, to techniques for camera calibration autonomously from a single perspective. That is, implementations herein provide a robust technique for camera extrinsic calibration that overcomes inaccuracy in typical point-based approaches. The technique includes a pre-set target 210 (FIG. 2) that exhibits characteristics of orthogonality with simple geometric patterns. The target or camera is placed such that at least two of the sides of the target are within the field of view of each camera, thus allowing the orthogonality projection from world coordinate to camera coordinate system. The technique also includes combining a pair of linear features to obtain a vanishing point corresponding to orthogonal directions in world coordinate system. A three dimensional (3D) vanishing point is obtained that represents the orthogonal axis to form the camera extrinsic rotation matrix. The calibrated camera parameters may then be used for accurate photogrammetric measurements in automobile camera calibration applications (such as at end of line camera calibration applications that occur at the end of line of the vehicle assembly line). The calibration technique includes a robust method with high accuracy for camera calibration and a pre-set calibration target that can be easily defined for placing a camera between two simple geometric patterns that exhibit orthogonality attained among the horizontal and vertical pair-parallel lines of the geometric patterns. The target may be a 3D target that has parallel lines that, when viewed by the camera will converge toward a respective vanishing point for that side of the target. Optionally, the target may comprise a two dimensional (2D) target having non-parallel or converging lines (e.g., the top and bottom lines of a portion of the 2D target may converge toward each other), whereby the system determines the vanishing point based on the detected non-parallel lines of the portions of the 2D target.

Figure 3:
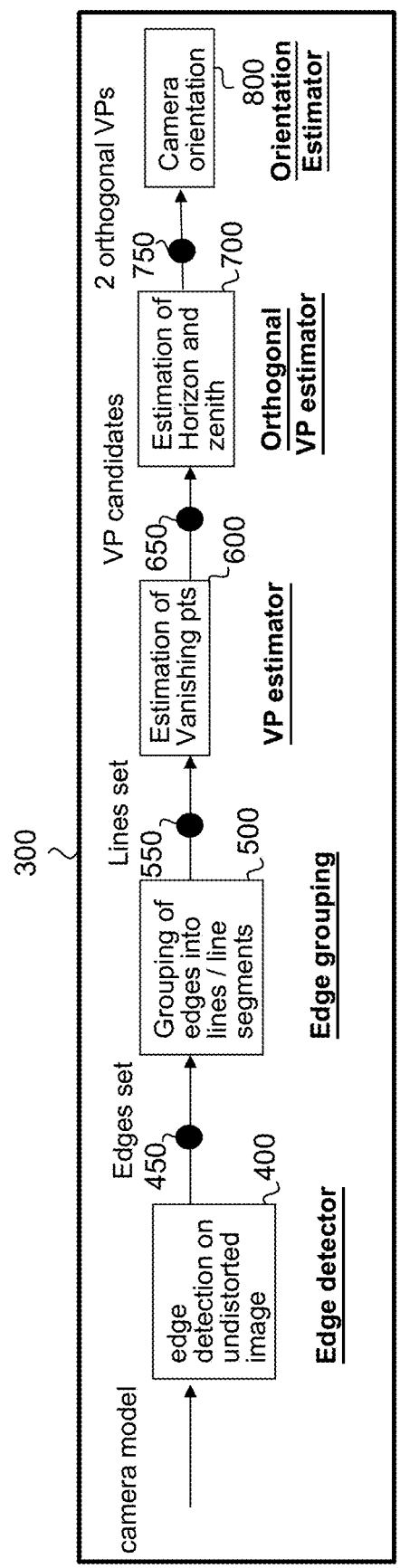
FIG. 3 is a schematic view of a calibration system to calibrate a vehicular camera in accordance with the present invention.

Referring now to FIG. 3, a calibration system 300 for calibrating a camera (e.g., any one or all of cameras 14*a*-14*d* of FIG. 1) includes an edge detector 400, an edge grouper 500, a vanishing point (VP) estimator 600, an orthogonal VP refiner 700, and an orientation estimator 800. The system 300 identifies a target location based on template matching with an absolute sum difference between a predefined template and input testing a de-warped image. The edge detector 400 receives the de-warped image (captured by the camera being calibrated) and reconstructs the image based on given lens distortion coefficients. The lens distortion coefficients may be based generally or specifically on the camera being calibrated. The edge detector may include a zig-zag effect reduction in the received image and apply edge transformation to give or determine edge sets 450 from the image.

The edge grouper 500 receives the edge sets 450 from the edge detector. The edge grouper 500 employs a longest line linkage from the edge sets by computing a line distance and angles based on a pixel gradient and normal coefficients to yield edge pixels to determine or generate a set of lines and/or line segments 550. Using the set of lines 550, the VP estimator 600 estimates facade of edges and, for example, uses a J-linkage operation to ensure the pair-parallel lines cluster with minimum distance to produce VP candidates 650. The VP estimator 600 sends the VP candidates 650 to the VP refiner 700. The VP refiner 700 refines the VP candidates 650 to determine one or more optimized VPs 750 (e.g., two orthogonal VPs 750) based on the orthogonal constraint. Optionally, the VP refiner 700 obtains a horizontal VP 750 and a vertical VP 750 or a plurality (e.g., two) horizontal VPs 750 and a vertical VP 750. Using the orthogonal VPs 750, the orientation estimator 800 coordinates alignment between the 3D world scene and the 2D camera image by arranging the obtained VPs 750 into an orientation matrix (e.g., a 3 by x matrix). The camera orientation (i.e., the pitch-yaw-roll of the camera relative to the vehicle) may be calculated using the orientation matrix.

Figure 4:
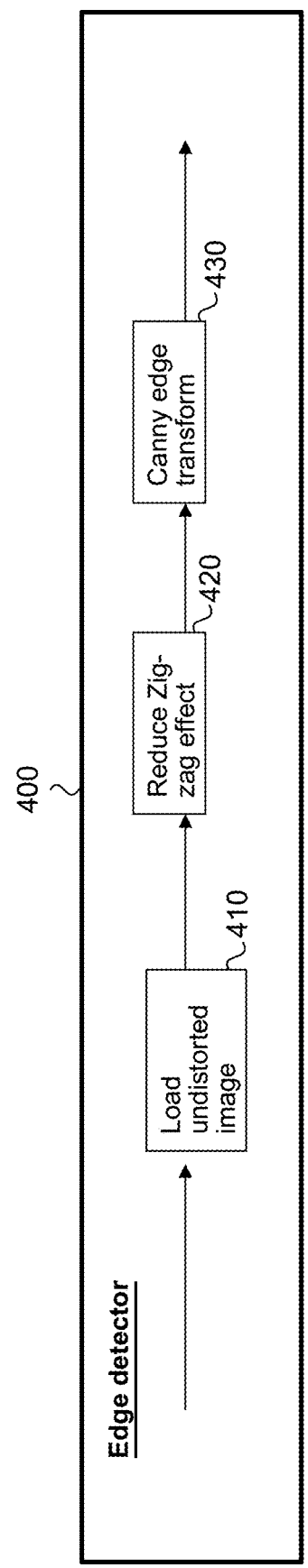
FIG. 4 is a schematic view of an edge detector of the calibration system of claim 3.

Referring now to FIG. 4, the edge detector 400 receives an undistorted image (e.g., an image that has been de-warped) from the camera being calibrated that includes the target object 210 at step 410. That is, the target object 210 was within the field of view of the camera when the camera captured the image. At step 420, the edge detector 400 reduces any zig-zag effect in the image. At step 430, the edge detector 400 performs a canny edge transform (i.e., using a canny edge detector) to detect edges of the target 210 within the image. For example, the canny edge transform may include applying a Gaussian filter to smooth the image, finding intensity gradients of the image, applying non-maximum suppression to remove spurious responses, applying a double threshold to determine potential edges, and/or tracking edges by hysteresis.

Figure 5:
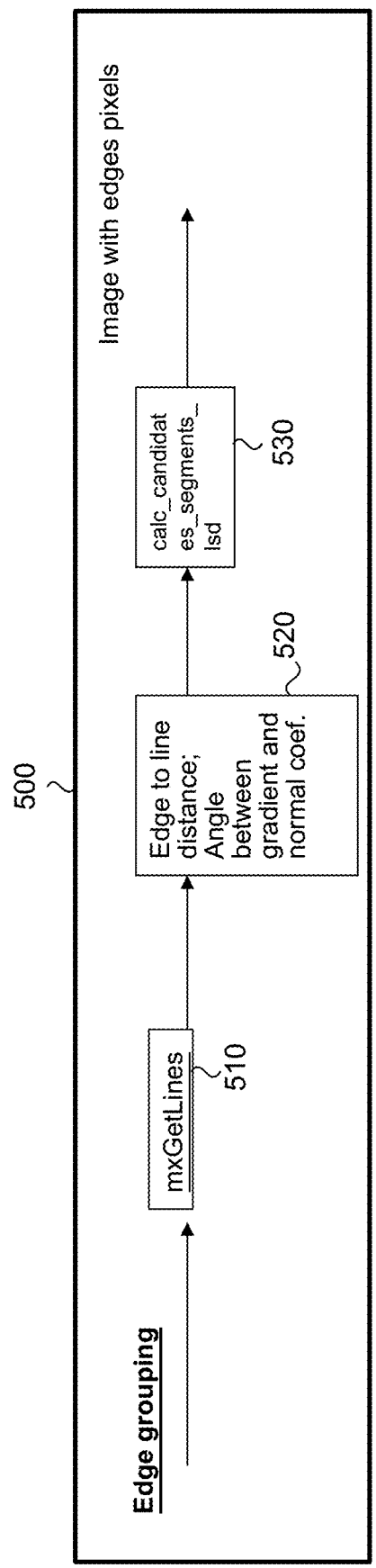
FIG. 5 is a schematic view of an edge grouper of the calibration system of claim 3.
Figure 6:
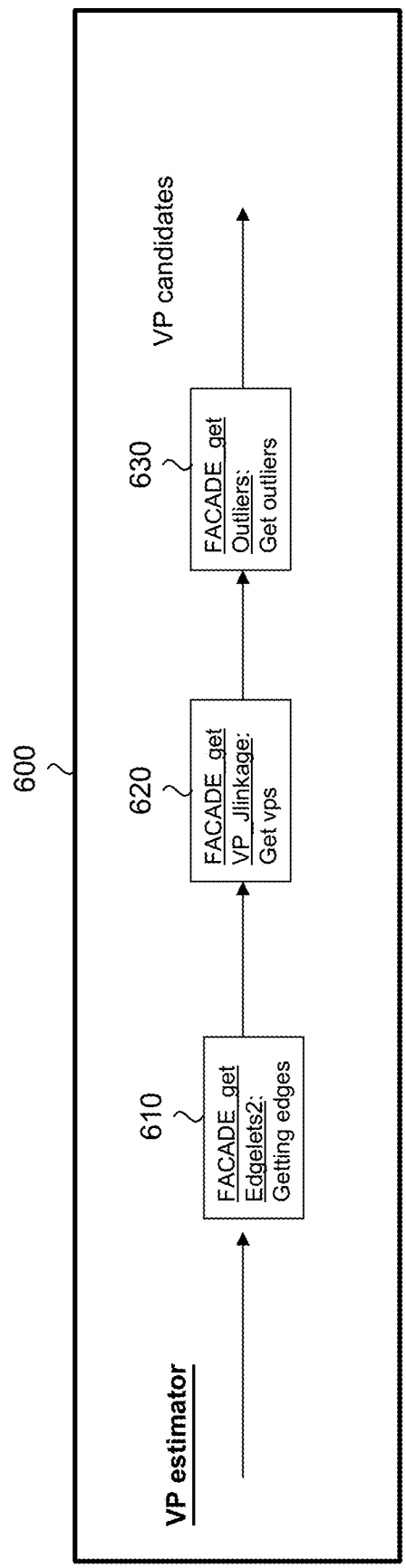
FIG. 6 is a schematic view of an vanishing point estimator of the calibration system of claim 3.

Referring now to FIG. 5, the detected edges 450 are passed to the edge grouper 500 at 510. The edge grouper determines an edge to line distance and an angle between gradient and normal coefficients at step 520. The edge grouper 500 calculates candidate segments at 530 to determine edge pixels of the image (i.e., pixels at the edge of the target) to generate the line sets 550. The VP estimator 600 (FIG. 6) receives the line sets 550 (i.e., edge pixels) at 610. Using the edge pixels, the VP estimator 600 may perform a J-linkage operation (i.e., a tailored agglomerative clustering) at 620 and determine outliers at 630 to produce VP candidates 650.

Figure 7:
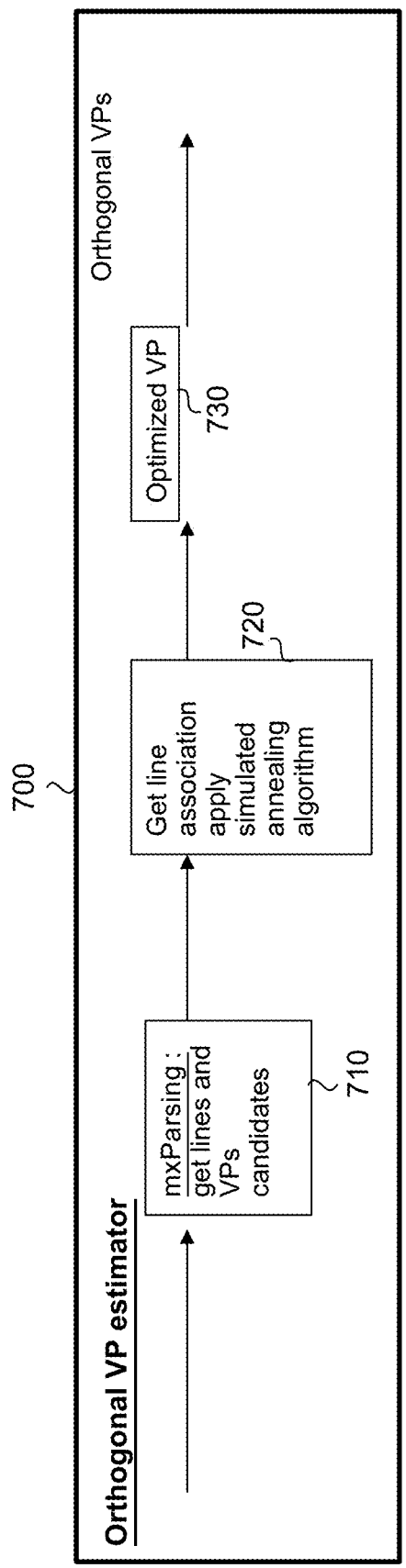
FIG. 7 is a schematic view of orthogonal vanishing point estimator of the calibration system of claim 3.
Figure 8:
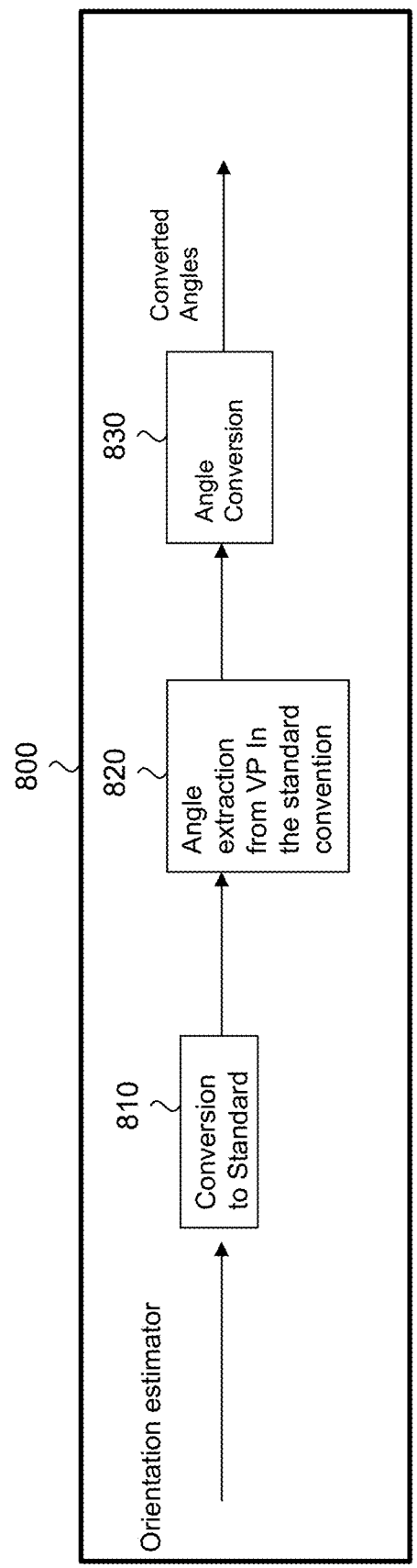
FIG. 8 is a schematic view of an orientation estimator of the calibration system of claim 3.

Referring now to FIG. 7, the orthogonal VP estimator 700 receives the edge lines 550 and the VP candidates 650 at 710. At step 720, the orthogonal VP estimator 700 determines line association among the edge lines 550 by applying, for example, a simulated annealing algorithm. At step 730, the orthogonal VP estimator 700 optimizes the candidate VPs 650 using the line associations to determine orthogonal VPs 750. The orientation estimator 800 (FIG. 8), using the orthogonal VPs 750, may convert the orthogonal VPs 750 into a standard convention at 810 and extract the angles from the converted VPs 750 at step 820. Optionally, the orientation estimator 800 may covert the angles to another convention if desired at 830.

Thus, the calibration system calibrates a vehicular camera (such as cameras 14a-d of FIG. 1) with orthogonal vanishing points. An intrinsic camera matrix K, R is a camera rotation matrix. A point $X_i$ in the 3D scene may be perspective projected by:

$$p_i = KRX_i \text{ for Vanishing Points } X_i^T X_j = 0 \quad (1)$$

In Equation (1), $P_i$ is the calculated VP in the camera image. The calibration system sets directions of the vanishing points in the rotation matrix (e.g., $X_i=[1, 0, 0]$) and each VP provides one column for R. Because of special orthonormal properties of R (e.g., inv(R)=R^T), each row and column of R has unit length.

Figure 9:
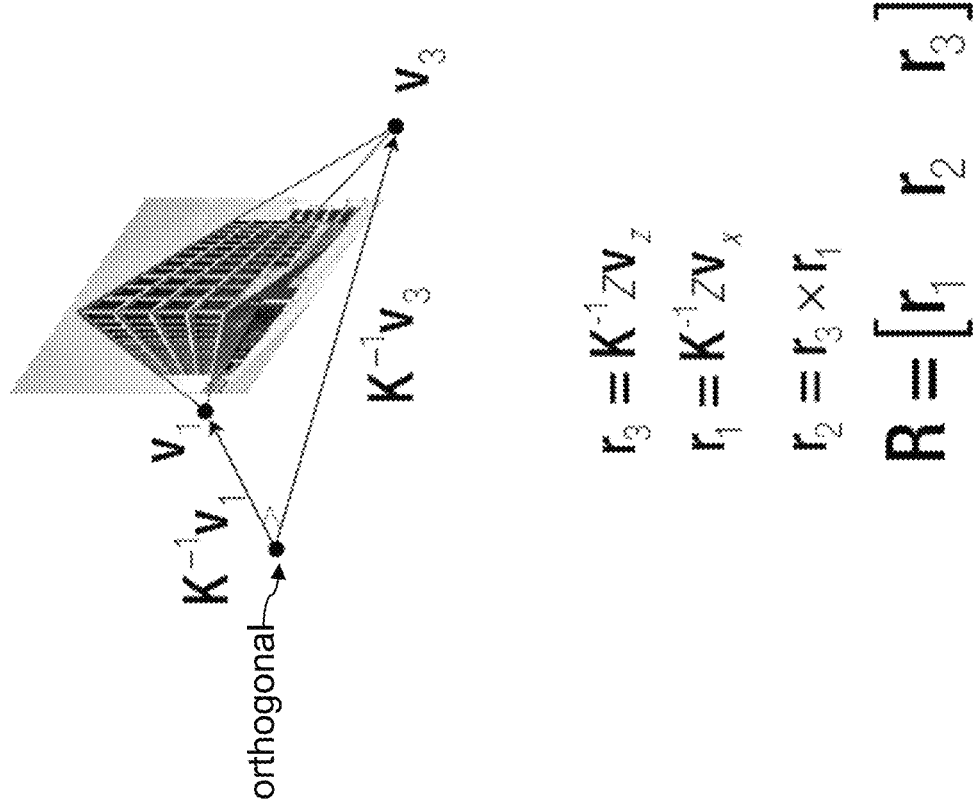
FIG. 9 is a schematic view of a rotation matrix estimate using vanishing points.
Figure 10:
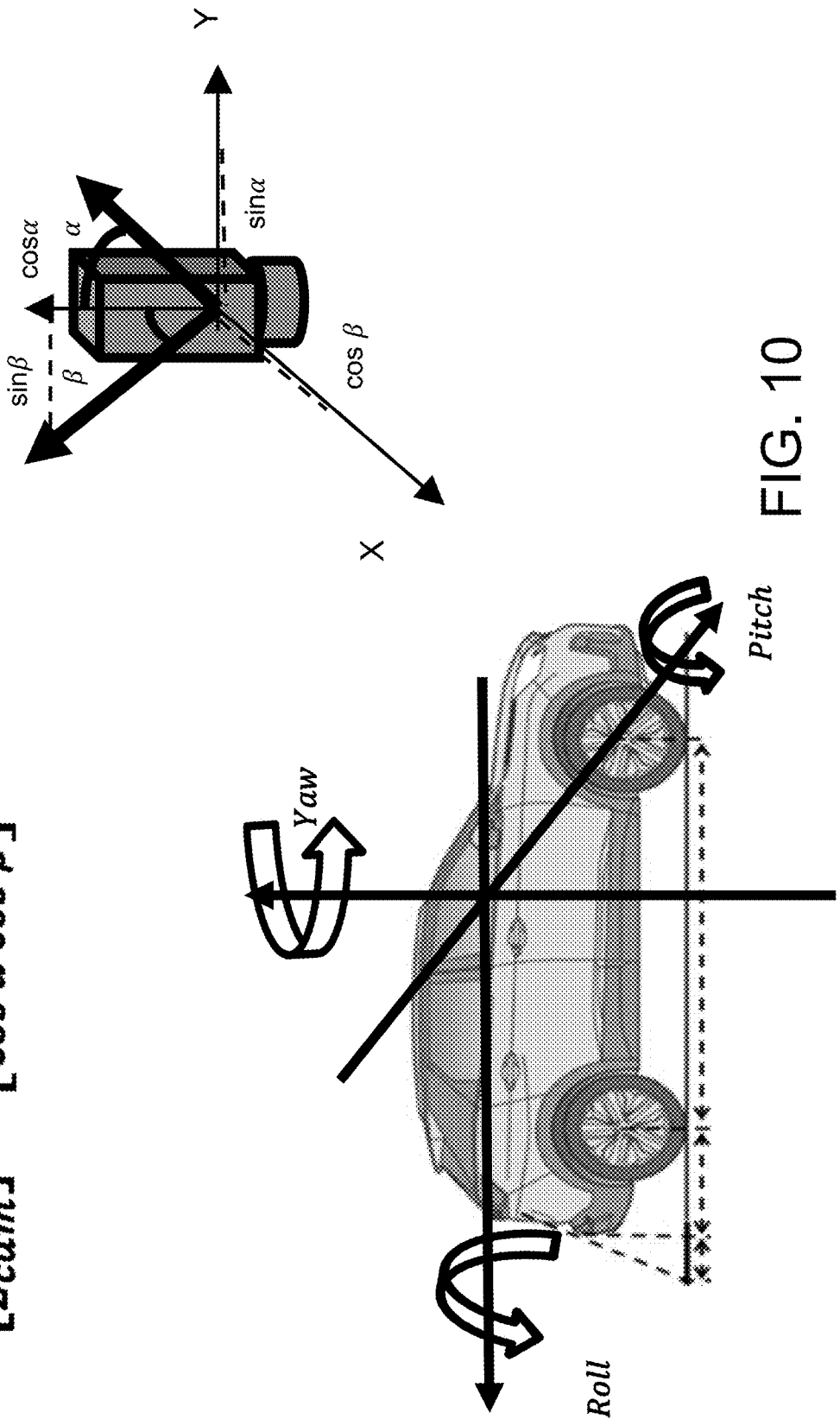
FIG. 10 is a camera downward view of a vehicle.
Figure 11:
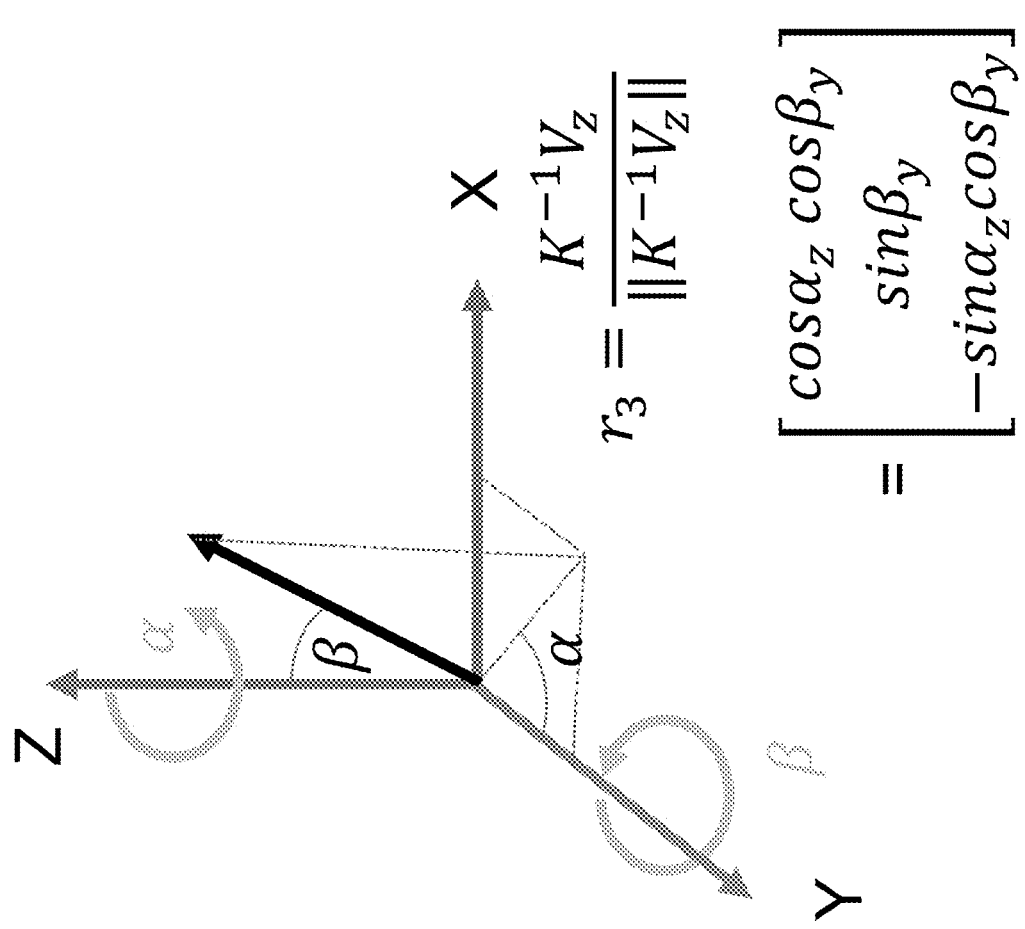
FIG. 11 is a schematic view of a rotation matrix with the right hand principle.

Referring now to FIG. 9, when K is a camera intrinsic matrix, the vanishing points (e.g., $v_1$, $v_3$) may be used to estimate the rotation matrix as illustrated in FIG. 9. FIG. 10 illustrates the pitch, roll, and yaw axes of the vehicle from the perspective of a downward viewing camera (i.e., a bird's-eye view). The pitch of the vehicle being pivoting or rotation about a laterally extending horizontal axis, the yaw of the vehicle being pivoting or rotation about a vertical axis, and the roll of the vehicle being pivoting or rotation about a longitudinal axis of the vehicle. FIG. 11 illustrates rotation with the "right hand" principle. A rotation matrix may be defined as $[r_1\ r_2\ r_3]$. Columns of the rotation matrix represent vanishing points of world axes such that:

$$v_z = K r_3 \text{ such that } r_3 = \frac{K^{-1} V_z}{\|K^{-1} V_z\|}$$

Thus, the calibration system provides high performance because the vanishing point position estimation is primarily affected by the angles of the lines rather than by each point's absolute position and the angles of the lines may be robustly estimated in most photometry measurement cases.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352;

US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for calibrating a vehicular vision system, the method comprising:
   equipping a vehicle with the vehicular vision system, the vehicular vision system comprising at least one vehicular camera disposed at the vehicle;
   placing a target within a field of view of the vehicular camera, wherein a first portion of the target comprises a first geometric pattern on a first plane of the target and a second portion of the target comprises a second geometric pattern on a second plane of the target, and wherein the first plane and the second plane are different, and wherein, with the target placed within the field of view of the vehicular camera, the first portion and the second portion are within the field of view of the vehicular camera;
   capturing image data with the camera, the captured image data representative of the field of view of the vehicular camera;
   providing the captured image data to an image processor;
   detecting, via processing at the image processor of the captured image data, first and second edges of the first portion of the target and third and fourth edges of the second portion of the target;
   determining, via processing at the image processor of the captured image data, first edge pixels representative of the first detected edge of the first portion of the target, second edge pixels representative of the second detected edge of the first portion of the target, third edge pixels representative of the third detected edge of the second portion of the target, and fourth edge pixels representative of the fourth detected edge of the second portion of the target;
   determining a first vanishing point based on the determined first edge pixels of the first portion of the target and the determined second edge pixels of the first portion of the target, and determining a second vanishing point based on the determined third edge pixels of the second portion of the target and the determined fourth edge pixels of the second portion of the target;
   determining camera orientation based on location of the determined first vanishing point relative to location of the determined second vanishing point; and
   calibrating the vehicular vision system for the vehicular camera based on the determined camera orientation.

2. The method of claim 1, wherein detecting edges of the target comprises performing a Canny edge detection.

3. The method of claim 1, wherein detecting edges of the target comprises reducing a zig-zag effect of the captured image data.

4. The method of claim 1, wherein determining the first and second edge pixels of the first and second detected edges of the first portion of the target and determining the third and fourth edge pixels of the third and fourth detected edges of the second portion of the target comprises determining a line distance and a line angle based on a pixel gradient and coefficients.

5. The method of claim 1, wherein determining the first and second edge pixels of the first and second detected edges of the first portion of the target and determining the third and fourth edge pixels of the third and fourth detected edges of the second portion of the target comprises grouping the edge pixels of the respective detected edges into respective lines.

6. The method of claim 1, wherein determining the first and second vanishing points comprises performing a J-linkage operation to ensure pair-parallel lines cluster with minimum distance.

7. The method of claim 1, wherein determining the first and second vanishing points comprises performing a simulated annealing algorithm.

8. The method of claim 1, comprising determining, via processing by the image processor of the captured image data, at least two orthogonal vanishing point candidates based on the determined first vanishing point of the first portion of the target and based on the determined second vanishing point of the second portion of the target.

9. The method of claim 8, wherein determining two orthogonal vanishing point candidates comprises estimating location of the horizon and zenith.

10. The method of claim 1, wherein the first plane and the second plane are orthogonal to each other.

11. The method of claim 1, further comprising, prior to detecting the first and second edges of the first portion of the target and the third and fourth edges of the second portion of the target, dewarping the captured image data.

12. The method of claim 1, further comprising determining an orientation matrix based on the determined first and second vanishing points and determining the camera orientation based on the orientation matrix.

13. The method of claim 12, wherein determining camera orientation based on the determined orientation matrix comprises determining (i) a pitch, (ii) a yaw, and (iii) a roll of the camera.

14. A vehicular vision calibration system, the system comprising:
   a camera disposed at a vehicle and having a field of view exterior of the vehicle, the camera capturing image data;
   an electronic control unit (ECU) comprising electronic circuitry and associated software;
   wherein the electronic circuitry of the ECU comprises an image processor for processing image data captured by the camera to detect presence of objects in the field of view of the camera;
   wherein the ECU, responsive to processing by the image processor of image data captured by the camera, captures image data representative of a target within the field of view of the camera, wherein a first portion of the target comprises a first geometric pattern on a first plane of the target and a second portion of the target comprises a second geometric pattern on a second plane of the target, and wherein the first plane and the second plane are different, and wherein, with the captured image data is representative of both the first portion and the second portion of the target;

wherein the ECU detects, via processing at the image processor of the captured image data, first and second edges of the first portion of the target and third and fourth edges of the second portion of the target;

wherein the ECU determines, via processing at the image processor of the captured image data, first edge pixels representative of the first detected edge of the first portion of the target, second edge pixels representative of the second detected edge of the first portion of the target, third edge pixels representative of the third detected edge of the second portion of the target, and fourth edge pixels representative of the fourth detected edge of the second portion of the target;

wherein the ECU determines a first vanishing point based on the determined first edge pixels of the first portion of the target and the determined second edge pixels of the first portion of the target, and wherein the ECU determines a second vanishing point based on the determined third edge pixels of the second portion of the target and the determined fourth edge pixels of the second portion of the target;

wherein the ECU determines camera orientation of the camera based on location of the determined first vanishing point relative to location of the determined second vanishing point; and wherein the ECU calibrates the camera based on the determined camera orientation.

15. The system of claim 14, wherein the ECU detects edges of the target by performing a Canny edge detection.

16. The system of claim 14, wherein the ECU determines the first and second edge pixels of the first and second detected edges of the first portion of the target and determines the third and fourth edge pixels of the third and fourth detected edges of the second portion of the target by determining a line distance and a line angle based on a pixel gradient and coefficients.

17. The system of claim 14, wherein the ECU determines the first and second vanishing points by performing a J-linkage operation to ensure pair-parallel lines cluster with minimum distance.

18. The system of claim 14, wherein the ECU determines the first and second vanishing points by performing a simulated annealing algorithm.

19. The system of claim 14, wherein the ECU determines, via processing by the image processor of the captured image data, at least two orthogonal vanishing point candidates based on the determined first vanishing point of the first portion of the target and based on the determined second vanishing point of the second portion of the target.

20. The system of claim 14, wherein the ECU determines two orthogonal vanishing point candidates via estimating location of the horizon and zenith.

21. A method for calibrating a vehicular vision system, the method comprising:

equipping a vehicle with the vehicular vision system, the vehicular vision system comprising at least one vehicular camera disposed at the vehicle;

placing a target within a field of view of the vehicular camera, wherein a first portion of the target comprises a first geometric pattern on a first plane of the target and a second portion of the target comprises a second geometric pattern on a second plane of the target, and wherein the first plane and the second plane are different, and wherein, with the target placed within the field of view of the vehicular camera, the first portion and the second portion are within the field of view of the vehicular camera;

capturing image data with the camera, the captured image data representative of the field of view of the vehicular camera;

providing the captured image data to an image processor;

detecting, via processing at the image processor of the captured image data, first and second edges of the first portion of the target and third and fourth edges of the second portion of the target;

determining, via processing at the image processor of the captured image data, first edge pixels representative of the first detected edge of the first portion of the target, second edge pixels representative of the second detected edge of the first portion of the target, third edge pixels representative of the third detected edge of the second portion of the target, and fourth edge pixels representative of the fourth detected edge of the second portion of the target;

determining a first vanishing point based on the determined first edge pixels of the first portion of the target and the determined second edge pixels of the first portion of the target, and determining a second vanishing point based on the determined third edge pixels of the second portion of the target and the determined fourth edge pixels of the second portion of the target;

determining, via processing by the image processor of the captured image data, at least two orthogonal vanishing point candidates based on the determined first vanishing point of the first portion of the target and based on the determined second vanishing point of the second portion of the target;

determining an orientation matrix based on the determined orthogonal vanishing point candidates;

determining camera orientation based on location of the determined orientation matrix; and calibrating the vehicular vision system for the vehicular camera based on the determined camera orientation.

22. The method of claim 21, wherein detecting at least one edge of the target comprises reducing a zig-zag effect of the captured image data.

23. The method of claim 21, wherein determining the first and second edge pixels of the first and second detected edges of the first portion of the target and determining the third and fourth edge pixels of the third and fourth detected edges of the second portion of the target comprises grouping the edge pixels of the respective detected edges into respective lines.

24. The method of claim 21, wherein determining the first and second vanishing points comprises performing a J-linkage operation to ensure pair-parallel lines cluster with minimum distance.

* * * * *